United States Patent [19]

Gessinger et al.

[11] Patent Number: 4,707,576

[45] Date of Patent: Nov. 17, 1987

[54] ARCING CONTACT TIP AND METHOD FOR PRODUCING SUCH AN ARCING CONTACT TIP OR A COMPARABLE COMPONENT

[75] Inventors: Gernot Gessinger, Birmenstorf; Renata Sebalj, Rutihof-Baden; Wolfgang Widl, Glattbrugg, all of Switzerland

[73] Assignee: BBC Brown, Boveri & Co., Ltd., Switzerland

[21] Appl. No.: 867,532

[22] Filed: May 28, 1986

[30] Foreign Application Priority Data

Jun. 24, 1985 [CH] Switzerland .......................... 2676/85
Aug. 23, 1985 [CH] Switzerland .......................... 3650/85

[51] Int. Cl.⁴ ............................................. H01H 33/12
[52] U.S. Cl. ................................. 200/146 R; 200/262; 200/264; 200/267
[58] Field of Search .................... 200/267, 146 R, 264, 200/262

[56] References Cited

U.S. PATENT DOCUMENTS 1,201,424  10/1916  Ambruster ..................... 200/146 R
1,529,616   3/1925  Dodgson ........................ 200/146 R
1,837,812  12/1931  Greenwood .................... 200/146 R
2,235,171   3/1941  Schilgen et al. ................ 200/146 R

FOREIGN PATENT DOCUMENTS 2310129  9/1974  Fed. Rep. of Germany ... 200/146 R

Primary Examiner—Robert S. Macon
Attorney, Agent, or Firm—Ostrolenk, Faber, Gerb & Soffen

[57] ABSTRACT

The arc withstanding electrodes in an electric circuit breaker for switching high voltages attain greater mechanical strength and improved arc withstanding capabilities by forming the arc withstanding electrodes of a carbon-fiber-reinforced-graphite material which material is constituted of a graphite matrix which is reinforced by carbon fibers embedded therein. A method for forming the carbon-fiber-reinforced-graphite of the arc electrodes and for affixing the arc electrodes to a metal carrier therefor includes the steps of employing a high-temperature solder based on copper and/or silver, containing at least one carbide-forming element such as, for example, Cr.

18 Claims, 3 Drawing Figures

ARCING CONTACT TIP AND METHOD FOR PRODUCING SUCH AN ARCING CONTACT TIP OR A COMPARABLE COMPONENT

BACKGROUND OF THE INVENTION

The present invention relates to an arcing contact tip and to the method and manufacture thereof.

Generally the invention relates to the art such as is described, for instance, in German Auslegeschrift No. 2,527,326. An electric circuit breaker of the prior art has two arcing contact tips which can be brought into or out of engagement with each other along one axis. At least one of the tips contains a coaxially arranged contact carrier extending along the axis and comprising a carbon-containing arc electrode mounted on the contact carrier. Use of such a carbon-containing arc electrode reduces the contact erosion of the arcing contact tip, as compared to a metallic arcing contact tip. However, the ability of an arcing contact tip comprising a carbon-containing arc electrode to absorb the mechanical forces occurring during the connecting and disconnecting of an electric circuit breaker, are quite limited.

SUMMARY OF THE INVENTION

The present invention achieves the object of creating an arcing contact tip of the generic type which, while retaining the feature of low contact erosion, has a high mechanical strength. The invention further provides a method by which such an arcing contact tip or a comparable component can be produced in simple manner.

The arcing contact tip according to the present invention is characterised by high impact resistance and a psuedoplastic fracture characteristic with low contact erosion. This makes it possible to bring the arcing contact tips of an electric circuit breaker into or out of engagement with each other at high speed without the risk of damage to the arc-carrying parts of the arcing contact tips which are in contact with each other or are separated from each other. The method according to the invention makes it possible to produce arcing contact tips or comparable components based on carbon-fiber-containing compound materials in reliable and reproducible manner.

In the text which follows, other characteristics and advantages of the invention are explained in greater detail with the aid of illustrative embodiments not restricting the invention and shown in the drawing, in which:

DETAILED DESCRIPTION OF THE PREFERRED EMBODIMENTS

Figure 1:
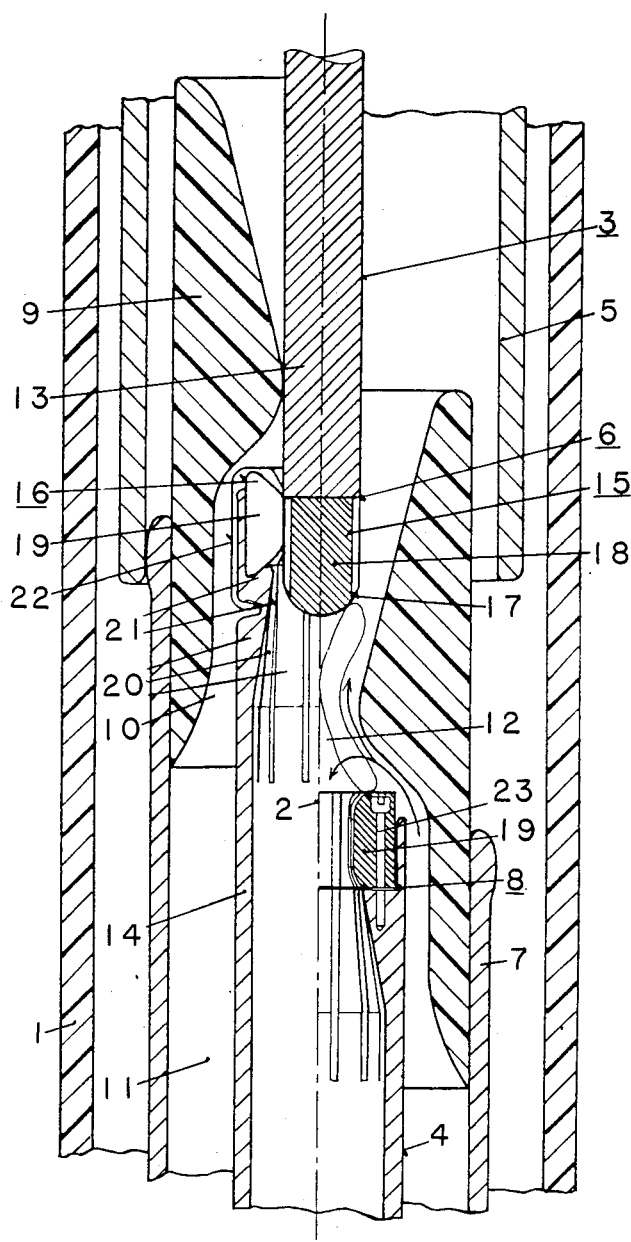
FIG. 1 shows a plan view of an axial section of an embodiment of an electric circuit breaker according to the invention, constructed as gas-blast circuit breaker and used in high-voltage switching systems, the condition in the closed position being shown in the left-hand half and the condition during the disconnecting being shown in the right-hand half.

In FIG. 1, a housing 1 of essentially hollow cylindrical construction and consisting, for instance, of insulating material is filled with an insulating gas such as, for example, sulfur hexafluoride at a pressure of few bars. It contains two contact members 2 and 3 which can be brought into or out of engagement with each other along an axis 2. The contact member 3 is connected in electrically conductive manner to a current connection, not shown, and contains a fixed rated-current contact 5 and a fixed arcing contact tip 6 of, for example, fully cylindrical construction. The contact member 4 is also connected in electrically conductive manner to another current connection, also not shown, and contains a movable rated-current contact 7 and a movable arcing contact member 8 of, for example, hollow cylindrical construction. The movable rated-current contact 7 carries on a part of its inner surface an insulating nozzle 9 which coaxially surrounds the arcing contact tips 6 and 8 and which, together with the movable arcing contact tip 8, delimits an annular duct 10 through which, during the disconnecting process, insulating gas located in a compressed-gas reservoir 11 and compressed, for example, by arc heating or mechanical work, enters into the arc zone 12 formed between the two arcing contact tips 6, 8 during the disconnecting process (see flow arrows in the right-hand half of the Figure).

At the free ends, facing each other and being in engagement with each other in the closed position (left-hand side of FIG. 1), of the arcing contacts 6 and 8, arc electrodes 15 and 16, respectively, are attached to contact carriers 13 and 14.

The arc electrode 15 is constructed as a solid cylindrical part and contains, at least partially, carbon fibers and a carbon matrix in which the carbon fibers are embedded. The arc electrode 15 has a high mechanical strength when the carbon fibers are oriented in all spatial directions or when a layer 17 of carbon fibers is wound preferably in the peripheral direction around the axis 2 onto a graphite core 18. The arc electrode 15 can be attached to the contact carrier 13, for example, by means of soldering. The arc electrode 15 and the contact carrier 13 can also be of hollow cylindrical construction. In this case, the arc electrode 15 preferably contains only the layer 17 of wound graphite fibers embedded in a carbon matrix. Such layers 17 can be produced, for example, by winding in accordance with the filament winding method or by winding on a carbon fiber fabric.

The arc electrode 16 is of annular construction and contains contact fingers 19 extending along the axis 2. The contact fingers 19 in each case also contain carbon fibers and a carbon matrix in which the carbon fibers are embedded. In this arrangement, the carbon fibers of the contact fingers 19 are preferably at least partially radially aligned since, as a result, a high electric and thermal conductivity for the purpose of easy removal of the arc current and the the arc heat and particularly high mechanical strength of the arc electrode 16 particularly during the impact on the arc electrode 15 during the closing process is achieved. Such radially extending carbon fibers are present, for example, in a material having three-dimensionally-aligned carbon fibers, but can also be achieved by using a two-dimensional carbon fiber fabric the first fiber direction of which extends radially with respect to the axis 2 and the second fiber direction of which extends axially or in the peripheral direction.

Each of the contact fingers is mounted on elastically constructed end sections 20 of the contact carrier 14 so that a good contact force exists between the arc electrodes 15 and 16 in the closed position (left-hand half of the Figure). The contact fingers 19 can be mounted by soldering thereof to the arc electrode 15, but can also be effected by supporting the contact fingers 19 on shoulders 21 which are fitted to one of the inside surfaces facing the axis 2 of the end sections 20 of the contact carrier 14. Retention of a contact finger 19 on one of the shoulders 21 can be effected, as specified in the left-hand half of the Figure, for example by a U-shaped leaf spring 22, one leg of which is locked into a recess fitted on the outside of one of the end sections 20 and the other leg of which reaches behind the free end, facing the fixed arcing contact 6 and beveled in direction of the axis 2, of the contact finger 19. As specified in the right-hand half of the Figure, the retention of a contact finger 19 can be effected on one of the shoulders 21, but also by means of a screw 23 which is extended approximately in the axial direction from the free end of the contact finger 19 into the shoulder 21.

During the disconnecting process of the gas-blast circuit breaker, the movable contact member 4 is moved downwardly by an operating mechanism, not shown. The operating mechanism can be of comparatively weak construction since the frictional forces to be overcome between the two arcing contact tips 6, 8, which are moved into each other in the closed position, are low even with high contact pressures because of the low coefficient of friction of carbon.

After the opening of the rated-current contact members 5, 7, the current to be disconnected commutates to a current path extending via the arcing contact tips 6, 8. After the arcing contact tips 6, 8 have been separated, a switching arc is formed the roots of which are located on the arc electrodes 15, 16. Because of the high arcing strength of carbon as compared to metal electrodes, only small amounts of harmful decomposition products are produced in the arc zone 12, and as a result, any deterioration of the quenching properties of the quenching gas-as, for instance, due to metal vapor when using metal electrodes-is eliminated. The relatively low erosion of the carbon electrodes also makes it possible to obtain a larger number of short-circuit breaking operations without inspection of the circuit breaker. When the current to be disconnected approaches a zero transition, the arc is blasted at the appropriate contact separation as specified by flow arrows.

During the closing process, the separated arcing contact tips 6, 8 are moved towards each other by the operating mechanism, not shown. During the closing movement, the two arc electrodes 15, 16 can impact on each other. Such contact bouncing is harmless since the high mechanical strength of the carbon fibers is fully effective to sustain the contact bouncing due to the appropriate alignment of the fibers.

Figure 2:
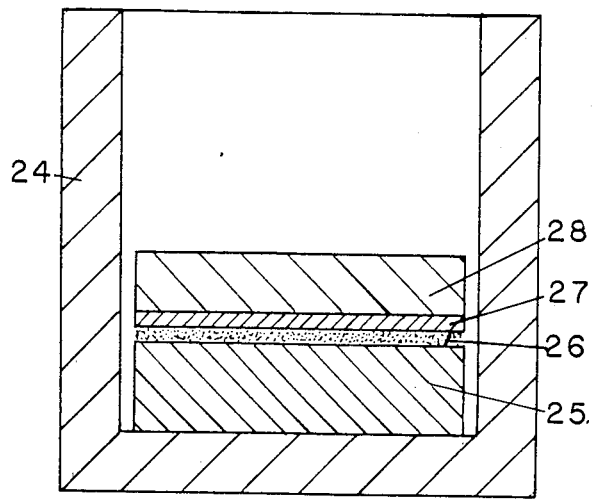
FIG. 2 shows a plan view of a section through a device for carrying out the method according to the invention.

In FIG. 2, a device is illustrated which aids in the soldering of carbon-fiber-reinforced graphite to a metal carrier. In this arrangement, a protective crucible 24 of sintered $Al_2O_3$ holds at the bottom thereof a carbon-fiber-reinforced graphite platelet 25. Cr particles 26 have been applied to the surface of the graphite platelet 25 in the form of a paste or a powder. A solder foil 27, for example a Cu/Sn/Ti alloy with 10% by weight Sn and 3% by weight Ti and the remainder Cu, is placed on top of these particles. Reference numeral 28 designates a molybdenum platelet which is to be joined to the graphite platelet 25. If necessary, the former can be additionally weighed down with a weight (not drawn).

The carbon-fiber-reinforced graphite platelet 25 is joined to the molybdenum platelet 28 by means of a high-temperature solder. In the illustrated embodiment, the carbon-fiber-reinforced graphite platelet has sides which measure 30×40 mm and a thickness of 10 mm. In reducing it to practice, it was placed flat onto the bottom of the protective crucible 24 and covered with a paste consisting of a slurry of the Cr particles 26 in toluene. The Cr particles 26 had a grain size of less than 40 μm. The composite was subsequently dried to eliminate the solvent. The powder layer of the Cr particles 26 had an average thickness of about 0.25 mm. The solder foil 27, having the dimensions of 30×40 mm and a thickness of 0.3 mm, was then placed onto the powder layer and weighed down with the molybdenum platelet 28 of 30×40×8 mm. The high-temperature solder had the following composition:

Sn=10% by weight
Ti=3% by weight
Cu=remainder

The solder foil 27 was produced by vacuum fusing of the components and hot rolling. The composite was then inserted into a vacuum furnace and inductively heated to a temperature of 950° C. and held at this temperature for 5 minutes. After the cooling, the compound workpiece was subjected to a tensile test which resulted in excellent adhesive strength.

Covering the carbon-fiber-reinforced graphite platelet 25 with Cr particles 26 serves to increase its wettability by high-temperature solder. Generally, carbide-forming elements such as Cr, Ti and so forth can be used for this purpose.

Figure 3:
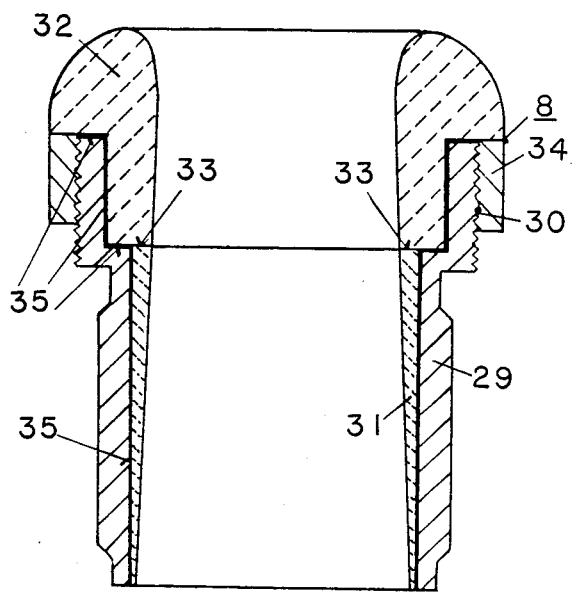
FIG. 3 shows a plan view of an axial section of an embodiment of an arcing contact for the electric circuit breaker according to FIG. 1.

FIG. 3 shows an embodiment of the movable arcing contact 8 of the electric circuit breaker according to FIG. 1. In this Figure, 29 designates a shouldered sleeve of steel, provided with a thread 30, which in the present example, is formed of a low-alloy steel having approximately 0.3% by weight C, 2.5% by weight Cr and small amounts of Mo and V. 31 designates a conical insert of graphite. The arc electrode 16 is constructed as carbon-fiber-reinforced graphite cap 32. The latter is bonded by means of a graphite adhesive 33 to the face of the conical graphite insert 31. 34 is a ring of a W/Cu alloy (for example 80% by weight W, 20% by weight Cu) which is used as end piece. This ring is screwed with the thread 30 onto the steel sleeve 29. The soldered faces between the graphite insert 31 and the carbon-fiber-reinforced graphite cap 32, on the one hand, and the steel sleeve 29, on the other hand, are given the reference symbol 35. During the production of the arcing contact 8, the carbon-fiber-reinforced graphite cap 32 was first turned out of a round rod. This component was then covered with a layer of solder on its outer jacket surface, proceeding as follows. In the vacuum furnace, a melt of the following composition was produced:

Sn=20% by weight
Ti=10% by weight
Cu=remainder

For retention and covering of the inside surface, a normal graphite piece fitting accurately to its inside and provided at the top with a suspension device was inserted from below into the graphite cap 32. The complete assembly was then preheated in the upper part of the induction coil of the vacuum furnace, lowered into the melt, left there at a temperature of 950° C. for 10 minutes and slowly pulled out of the melt again. During this process, the furnace was briefly flooded with argon before immersion of the component into the melt, evacuated again and again flooded with argon after removal and during the cooling of the component.

After the immersion process described above, a cylindrical workpiece of normal graphite (Type V 263 by Messrs. Steinemann, Otelfingen, Switzerland), having the outside diameter and the length of the jacket of the graphite insert 31, was covered with high-temperature solder on its jacket surface. After that, the material in the core was turned out and the graphite insert 31 was produced. The half aperture angle of the inside cone area was 2° 30'. The graphite insert 31 and the carbon-fiber-reinforced graphite cap 32 were then bonded together at their faces by means of the graphite adhesive 33, and the prefabricated steel sleeve 29 was shrunk onto the graphite insert 31 and the carbon-fiber-reinforced graphite cap 32. In addition to the 0.3% by weight C and 2.5% by weight Cr, the steel also contained small amounts of Mo and V. The shrinking-on results in greater reliability when the coefficients of expansion of the materials to be joined are greatly different. The composite was then inserted into a vacuum furnace and soldered for 10 minutes at 950° C. After the cooling, the ring 34 of a W/Cu alloy (80% by weight W, 20% by weight Cu) was also screwed onto the steel sleeve 29. The soldered faces 35 of this compound structure are emphasized by thick lines.

The invention is not restricted to the illustrative embodiments. Quite generally, the method for joining carbon-fiber-reinforced graphite to a metallic carrier material by means of high-temperature solder can be applied to all materials suitable for this method. As high-temperature solders, those based on Cu and/or Ag and having at least one carbide-forming element selected from the group of Cr, Mo, W, V, Nb, Ta, Ti, Zr, Hf at an amount of 1 to 10% by weight are used. The solder can be applied to the carbon-fiber-reinforced graphite either in molten form by immersion into a melt, in powder, foil or filament form or by vapor deposition. During the soldering process, the carrier material is pressed by gravitational force, spring force or thermomechanical forces (for example shrinking) against the solder surface. A vacuum (melting) furnace can be advantageously used for applying the solder layer and for carrying out the soldering process.

To improve the wettability of the carbon-fiber-reinforced graphite, a layer of particles of a carbide-forming element (Cr, Ti) in powder, paste or other form, for example as slurry in an alcohol (toluene, ethanol, and so forth) is preferably applied to the surface to be soldered before the soldering.

In addition to the solders specified in the examples, a solder of the following composition is also suitable:
Cr=1% by weight
Cu=remainder.

I claim:
1. A circuit breaker, comprising:
   first and second contacts which are disposed such that at least one of the contacts is movable along a predetermined axis to bring the contacts into and out of contact with one another; and
   first and second arc electrodes associated, respectively, with said first and second contacts, each of said arc electrodes extending around said axis and being disposed on a respective contact carrier therefor, each of said arc electrodes being formed of a carbon-fiber-reinforced graphite material which material comprises graphite matrix and a plurality of carbon fibers embedded in said graphite matrix.

2. A circuit breaker as in claim 1, wherein a major portion of said carbon fibers extend mainly along a peripheral direction around said axis.

3. A circuit breaker as in claim 2, wherein said graphite matrix comprises a graphite core and said carbon fibers are wound on said graphite core.

4. A circuit breaker as in claim 1, wherein at least one of said arc electrodes includes contact fingers which extend along said axis and which are mounted on elastically constructed end sections of a contact area of said arc electrode and wherein said carbon fibers are aligned primarily along a radial direction with respect to said axis.

5. A circuit breaker as in claim 4, wherein said end sections of said contact area have an inside surface facing said axis and a shoulder disposed on said inside surface and said contact fingers are supported on said shoulder.

6. A circuit breaker as in claim 5, further comprising a leaf spring for affixing at least one of said contact fingers to said shoulder.

7. A circuit breaker as in claim 5, further comprising a screw for affixing at least one of said contact fingers to said shoulder.

8. A method for producing an arc electrode of the type which comprises a carbon-fiber-reinforced graphite which is formed of a graphite matrix and a plurality of carbon fibers which are embedded in the graphite matrix and for affixing said arc electrode to a metallic carrier material, said method comprising the steps of:
   soldering said graphite matrix onto the metallic carrier material by means of a high-temperature solder in the presence of a protective gas atmosphere or a vacuum, said solder being a copper and/or silver solder and containing at least one carbide-forming element selected from the group of Cr, Mo, W, V, Nb, Ta, Ti, Zr, Hf having a content of about 1 to 10% by weight of said solder, said solder being applied in a molten, powder, foil or film form or by vapor deposition onto a surface of said graphite matrix which is reinforced by said carbon fibers;
   pressing said metallic carrier material against said carbon-fiber-reinforced graphite; and
   heating said solder to a soldering temperature in an inductively heated surface and thereafter cooling said solder to room temperature.

9. A method as in claim 8, further including the step of applying to said carbon-fiber-reinforced graphite a carbide-forming element having the form of a powder which is slurried in an organic liquid and applying said carbide-forming element to a surface of said carbon-fiber-reinforced graphite which is to be joined to the metallic carrier material whereby the wetability of said carbon-fiber-reinforced graphite is improved.

10. A method as in claim 8, wherein said high temperature solder is applied by immersing the carbon-fiber-reinforced graphite into a melt of said solder.

11. A method as in claim 8, wherein the metallic carrier material is comprised of molybdenum and said high temperature solder comprises about 99% by weight Cu and about 1% by weight Cr.

12. A method as in claim 8, wherein the metallic carrier material is comprised of molybdenum and said high temperature solder comprises about 87% by weight Cu, about 10% by weight Sn and about 3% by weight Ti.

13. A method as in claim 8, wherein the metallic carrier material comprises a low-alloy steel having about 0.3% by weight C, about 2% by weight Cr and further additives of No and V and wherein said high temperature solder comprises about 70% by weight Cu, about 20% by weight Sn and about 10% by weight Ti.

14. An arc withstanding electrode which is effective for withstanding an arc and mechanical stresses which develop between said arc electrode and another arc electrode, said arc electrode being formed of carbon-fiber-reinforced-graphite material which material comprises graphite matrix and a plurality of carbon fibers embedded in said graphite matrix.

15. An arc electrode as in claim 14, wherein said arc electrode is arranged peripherally around an axis associated with said arc electrode and wherein said carbon fibers extend generally circumferentially around said axis.

16. An arc electrode as in claim 14, wherein said arc electrode is arranged around an axis associated therewith and wherein said carbon fibers extend, in said graphite matrix, generally radially with respect to said axis.

17. An arc electrode as in claim 14, further comprising a metallic carrier material for supporting said arc electrode, said metallic carrier material being comprised of molybdenum.

18. An arc electrode as in claim 14, further comprising a metallic carrier material for supporting said arc electrode, said metallic carrier material being comprised of a low-alloy steel having about 0.3% by weight C, about 2% by weight Cr and further additives of No and V.

* * * * *